UNITED STATES PATENT OFFICE.

ELISHA W. POSTON, OF FORT WAYNE, INDIANA.

COMPOSITION FOR RENDERING PHOTOGRAPHIC AND OTHER PRINTS TRANSPARENT.

SPECIFICATION forming part of Letters Patent No. 243,968, dated July 5, 1881.

Application filed January 12, 1881. (No model.)

*To all whom it may concern:*

Be it known that I, ELISHA W. POSTON, a citizen of the United States, residing at Fort Wayne, in the county of Allen and State of Indiana, have invented certain new and useful Improvements in Composition for Rendering Pictures on Paper (Photographic or Otherwise) Transparent for Painting in Oil-Colors; and I do hereby declare that the following is a full, clear, and exact description of the invention, which will enable others skilled in the art to which it appertains to make and use the same.

Heretofore compositions have been used for the same purpose composed of balsam-fir, castor-oil, and alcohol, which give to the picture a sallow yellowish tint, which increases with age, owing principally to the balsam-fir, which is entirely left out in my composition and others added of less color and more stability. It is of great importance that the substances used for rendering the picture transparent should be as nearly colorless as possible, especially in portraiture, (for which this compound is particularly adapted,) in which the colors, being applied to the back of the picture, show through the transparent parts on the front side, and are affected by any intervening color in the picture, the effect of which is to impair the purity of the colors used. Again, the nature of balsam-fir is such that compounds containing it have a sticky quality, (as is the case in the one above mentioned,) which renders the cleaning of the surface very hazardous and liable to disturb the surface of the picture, while, on the other hand, my composition is entirely free from such tendency. Therefore, to meet the above requirements, I employ balsam-copaiba, castor-oil, turpentine, sulphuric ether, and paraffine. The use of paraffine is pre-eminently suitable in such composition on account of its durability and transparancy, forming an impervious coating, entirely excluding aqueous, gaseous, and atmospheric influences, which are the well-recognized agents of destructibility, while the turpentine and ether serve as solvents of the same. The balsam-copaiba gives body without liability of decoloration, as is well recognized by opticians, who employ it for sealing optical lenses, for which purpose balsam-fir was at one time used.

The object of my invention is to produce a composition which, when applied to the picture, will speedily render the same transparent to such an extent that when oil-paints are applied to the back the colors will show through on the other side without impairment.

To carry my invention into effect I procure a picture on paper, (photographic or otherwise,) mount it on canvas (which has been previously secured to a stretcher) with paste in the ordinary manner, and when dry I apply my composition to both sides of the picture, warm it gently for a few minutes, when it will be found that the picture, together with the mounting, will have acquired the transparency necessary. The face of the picture is then cleaned by rubbing with a soft cloth, when it is ready for painting, which is done on the back with oil-colors applied with a brush, in the manner well known to artists.

My composition consists of the following ingredients combined in the following proportions—viz., balsam-copaiba, castor-oil, turpentine, and sulphuric ether, each one ounce, and paraffine, twenty-five grains. The turpentine, sulphuric ether, and paraffine are to be combined by gentle heat and agitation before being added to the other ingredients; then thoroughly mingle all together by agitation.

What I claim is—

The herein-described composition for rendering pictures (photographic or otherwise) transparent, the same consisting of balsam-copaiba, castor-oil, turpentine, sulphuric ether, and paraffine, in or about the proportions specified.

ELISHA W. POSTON.

Witnesses:
FRED. W. GALLMEIER,
JOHN M. SPITLER.